(12) United States Patent
Winshtein et al.

(10) Patent No.: US 9,834,036 B2
(45) Date of Patent: Dec. 5, 2017

(54) SELECTIVE WHEEL SUSPENSION SYSTEM

(75) Inventors: Ronny Winshtein, Ramat-Hasharon (IL); Amichay Haim Gross, Herzliya (IL)

(73) Assignee: Soft Wheel LTD., Tel Aviv (IL)

( * ) Notice: Subject to any disclaimer, the term of this patent is extended or adjusted under 35 U.S.C. 154(b) by 702 days.

(21) Appl. No.: 14/114,843

(22) PCT Filed: Mar. 20, 2012

(86) PCT No.: PCT/IB2012/000530
§ 371 (c)(1),
(2), (4) Date: Oct. 30, 2013

(87) PCT Pub. No.: WO2012/153170
PCT Pub. Date: Nov. 15, 2012

(65) Prior Publication Data
US 2014/0060715 A1    Mar. 6, 2014

Related U.S. Application Data

(60) Provisional application No. 61/485,086, filed on May 11, 2011, provisional application No. 61/552,505, filed on Oct. 28, 2011.

(51) Int. Cl.
*B60B 9/28* (2006.01)
*B60B 9/02* (2006.01)
(Continued)

(52) U.S. Cl.
CPC ............... *B60B 9/28* (2013.01); *B60B 9/005* (2013.01); *B60B 9/02* (2013.01); *B60B 9/06* (2013.01);
(Continued)

(58) Field of Classification Search
CPC .... B60B 9/00; B60B 9/02; B60B 9/06; B60B 9/26; B60B 9/28; B60C 7/14; B60C 2007/146; B60C 7/16; B60C 7/18
(Continued)

(56) References Cited

U.S. PATENT DOCUMENTS 926,830 A * 7/1909 Sinnott ................. B60B 9/06
152/101
1,083,864 A * 1/1914 Shailer ................. B60B 9/06
152/91
(Continued)

FOREIGN PATENT DOCUMENTS

CN    20157878 Y    3/1994
CN    201214359 Y    4/2009
(Continued)

OTHER PUBLICATIONS

International Search Report dated Oct. 13, 2006 for PCT application No. PCT/CA2006/000888.
(Continued)

*Primary Examiner* — Jason Bellinger
(74) *Attorney, Agent, or Firm* — Clements Bernard Walker PLLC; Christopher L. Bernard

(57) ABSTRACT

A wheel connectable to a vehicle. The wheel includes a stationary member having an axis, a rotary member rotatable about the axis, and at least one support member positioned between the stationary member and the rotary member, thereby providing a normally fixed distance therebetween. The support member is adapted to retain the distance when stressed up to a threshold value and to recoverably alter the distance when stressed over the threshold value.

17 Claims, 8 Drawing Sheets

(51) Int. Cl.
*B60B 9/10* (2006.01)
*B60B 9/00* (2006.01)
*B60B 9/06* (2006.01)
*B60B 9/18* (2006.01)
*B60B 33/04* (2006.01)

(52) U.S. Cl.
CPC .................. *B60B 9/10* (2013.01); *B60B 9/18* (2013.01); *B60B 33/045* (2013.01); *B60B 2900/131* (2013.01)

(58) Field of Classification Search
USPC ....... 152/17, 53, 55, 61, 87, 90–91, 93, 100, 152/103
See application file for complete search history.

(56) References Cited

U.S. PATENT DOCUMENTS

| | | | |
|---|---|---|---|
| 1,132,787 A | 3/1915 | Mansfield | |
| 1,133,973 A | 3/1915 | Koch | |
| 1,189,963 A | 4/1916 | Jones | |
| 1,185,098 A | 5/1916 | Hopkins | |
| 1,193,733 A * | 8/1916 | Stringfellow | B60B 9/06 152/107 |
| 1,267,876 A * | 5/1918 | Kovacs | B60B 9/06 152/101 |
| 1,397,839 A * | 11/1921 | Livings | B60B 9/26 152/100 |
| 1,416,078 A | 5/1922 | Taylor | |
| 1,468,714 A * | 9/1923 | Grossman | B60B 9/28 152/101 |
| 1,495,699 A | 5/1924 | Kunoki | |
| 1,584,679 A * | 5/1926 | Stoltz | B60B 9/28 152/93 |
| 1,672,090 A | 6/1928 | Ringstod | |
| 1,673,056 A | 6/1928 | Stoltz | |
| 1,979,935 A | 11/1937 | Henap | |
| 2,238,410 A | 4/1941 | Capuciati | |
| 2,375,705 A * | 5/1945 | Starneno | B60B 9/26 152/87 |
| 2,639,140 A | 5/1953 | Frenkel | |
| 3,072,169 A | 1/1963 | Hastings, Jr. | |
| 3,896,868 A * | 7/1975 | Molitor | B60B 9/28 152/13 |
| 4,310,149 A | 1/1982 | Camilleri | |
| 4,465,321 A | 8/1984 | Berg | |
| 4,782,875 A | 11/1988 | Jones | |
| 4,840,357 A | 6/1989 | Jouade | |
| 4,872,651 A | 10/1989 | Thorn | |
| 4,903,792 A | 2/1990 | Ze-ying | |
| 5,104,201 A | 4/1992 | Ross | |
| D401,204 S | 11/1998 | Al-Sabah | |
| 6,041,838 A | 3/2000 | Al-sabah | |
| 6,257,604 B1 | 7/2001 | Laurent et al. | |
| 6,357,770 B1 | 3/2002 | Carpiaux et al. | |
| 6,386,529 B2 | 5/2002 | Bik et al. | |
| 6,588,473 B1 | 7/2003 | Walrond | |
| 6,698,480 B1 * | 3/2004 | Cornellier | B60B 9/26 152/100 |
| 6,991,076 B2 | 1/2006 | McAndrews | |
| 7,441,757 B2 | 10/2008 | Siemer et al. | |
| 7,537,228 B2 | 5/2009 | Shimizu et al. | |
| 7,699,326 B2 | 4/2010 | Yamada | |
| 7,810,533 B2 * | 10/2010 | Wichern | B60B 9/06 152/87 |
| 8,037,957 B2 | 10/2011 | Laurent | |
| 8,127,810 B2 * | 3/2012 | Wichern | B60B 9/06 152/87 |
| 8,240,689 B2 | 8/2012 | Holt et al. | |
| 8,863,794 B2 * | 10/2014 | Wichern | B62K 25/04 152/103 |
| 2006/0012144 A1 | 1/2006 | Kunzler et al. | |
| 2010/0218865 A1 | 9/2010 | Kim | |
| 2010/0219572 A1 | 9/2010 | Back | |
| 2011/0209938 A1 | 9/2011 | Basadzishvili | |
| 2013/0312464 A1 | 11/2013 | Davis | |
| 2013/0340902 A1 | 12/2013 | Kemeny | |
| 2014/0034198 A1 | 2/2014 | Wichem | |
| 2014/0060715 A1 | 3/2014 | Winshtein et al. | |

FOREIGN PATENT DOCUMENTS

| | | |
|---|---|---|
| DE | 235200 C | 6/1911 |
| DE | 3222262 A1 | 12/1983 |
| DE | 19983290 T1 | 6/2001 |
| DE | 102005032537 A1 | 1/2007 |
| EP | 0432079 A2 | 11/1990 |
| EP | 1029711 A2 | 8/2000 |
| FR | 351455 A | 7/1905 |
| FR | 464426 A | 3/1914 |
| FR | 614407 A | 12/1926 |
| FR | 730768 A | 8/1932 |
| FR | 1105719 A | 12/1955 |
| FR | 2795947 A1 | 1/2001 |
| FR | 2898077 A1 | 9/2007 |
| GB | 191217140 A | 0/1913 |
| GB | 191306920 A | 0/1913 |
| GB | 191124962 A | 4/1912 |
| GB | 191211637 A | 1/1913 |
| GB | 1549611 | 8/1979 |
| GB | 2188596 A | 10/1987 |
| GB | 2331966 A | 6/1999 |
| JP | 25725 | 4/1914 |
| JP | 35975 | 3/1921 |
| JP | S61207202 A | 9/1986 |
| JP | H04368203 A | 12/1992 |
| WO | 9715461 A1 | 5/1997 |
| WO | 0176351 A1 | 10/2001 |
| WO | 2005007497 A1 | 1/2005 |
| WO | 2006128291 A1 | 12/2006 |
| WO | 2009029990 A1 | 3/2009 |
| WO | 2012153170 A1 | 11/2012 |
| WO | 2013061121 A1 | 5/2013 |

OTHER PUBLICATIONS

International Search Report dated Oct. 13, 2012 for PCT application No. PCT/IB2012/000530.
International Search Report dated Jan. 1, 2013 for PCT application No. PCT/IB2012/001994.
Jun. 18, 2012 International Search Report issued for International Application No. PCT/IB 2012/000100.
Sep. 22, 2014 International Search Report issued for International Application No. PCT/IB2014/000580.

* cited by examiner

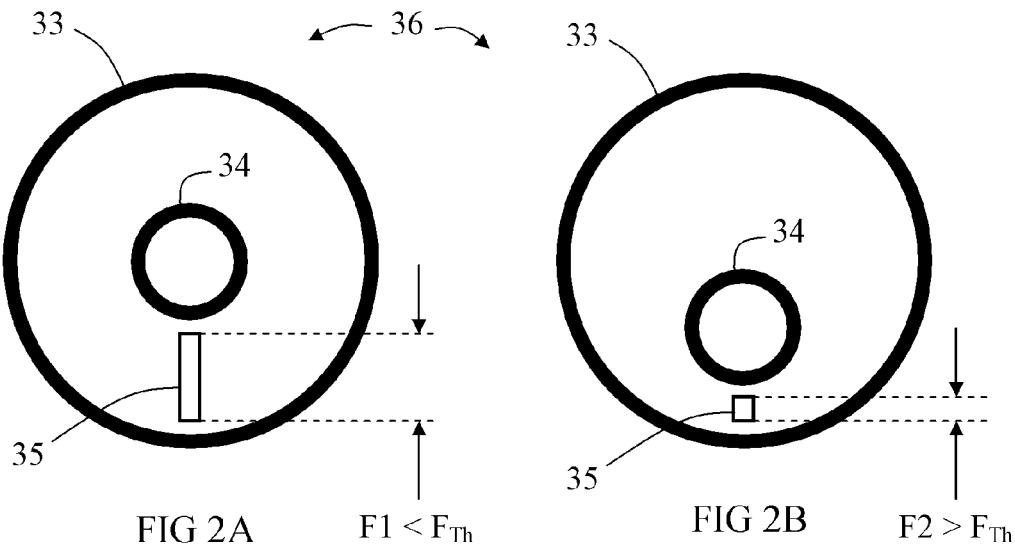
FIG 2A    F1 < F_Th
FIG 2B    F2 > F_Th
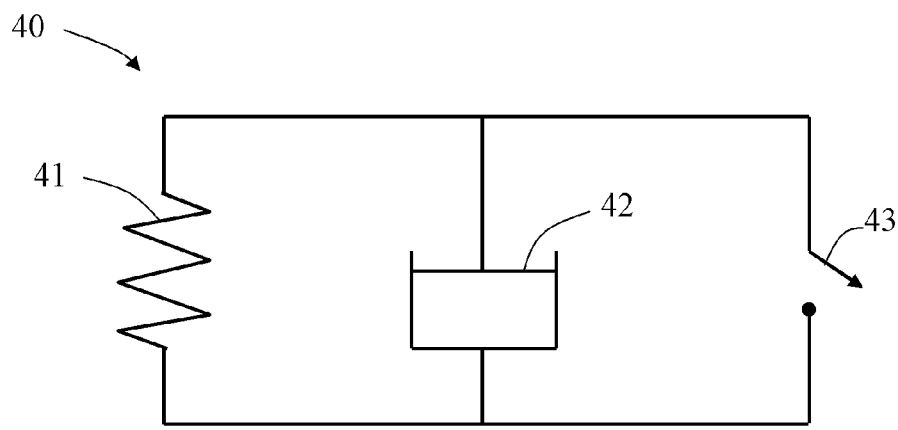
FIG 3A
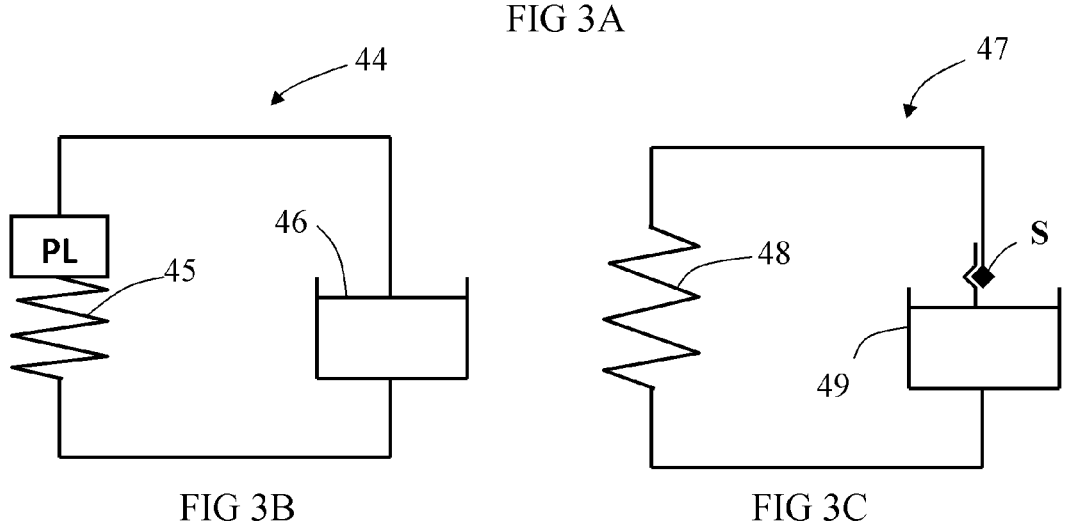
FIG 3B
FIG 3C

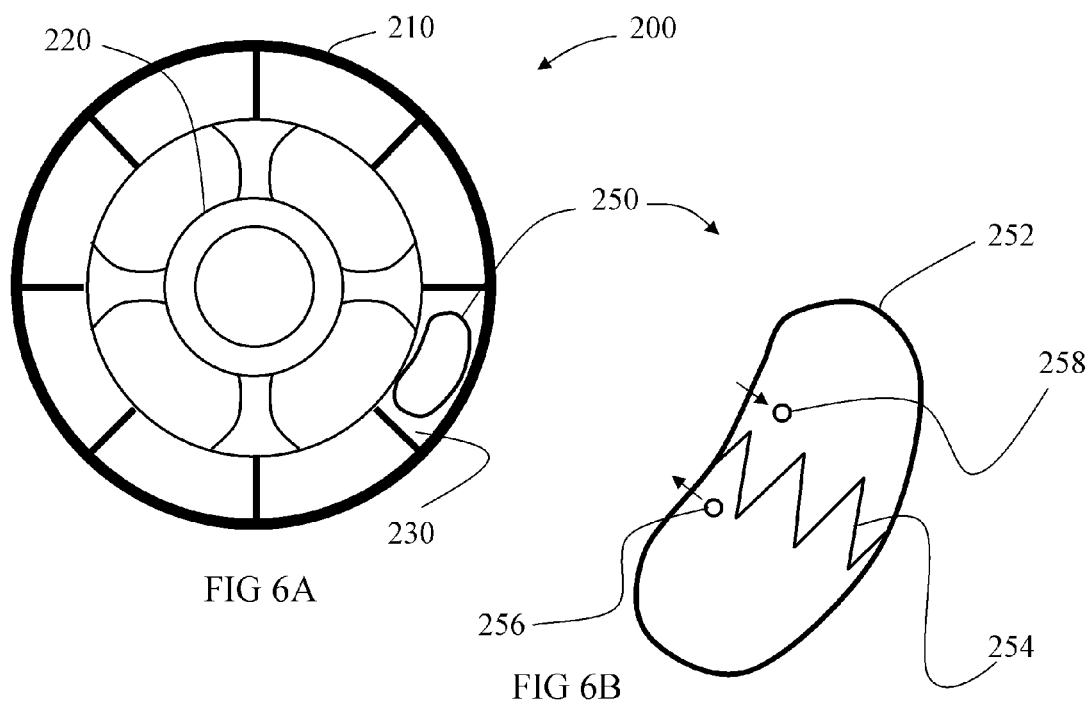
FIG 6A
FIG 6B
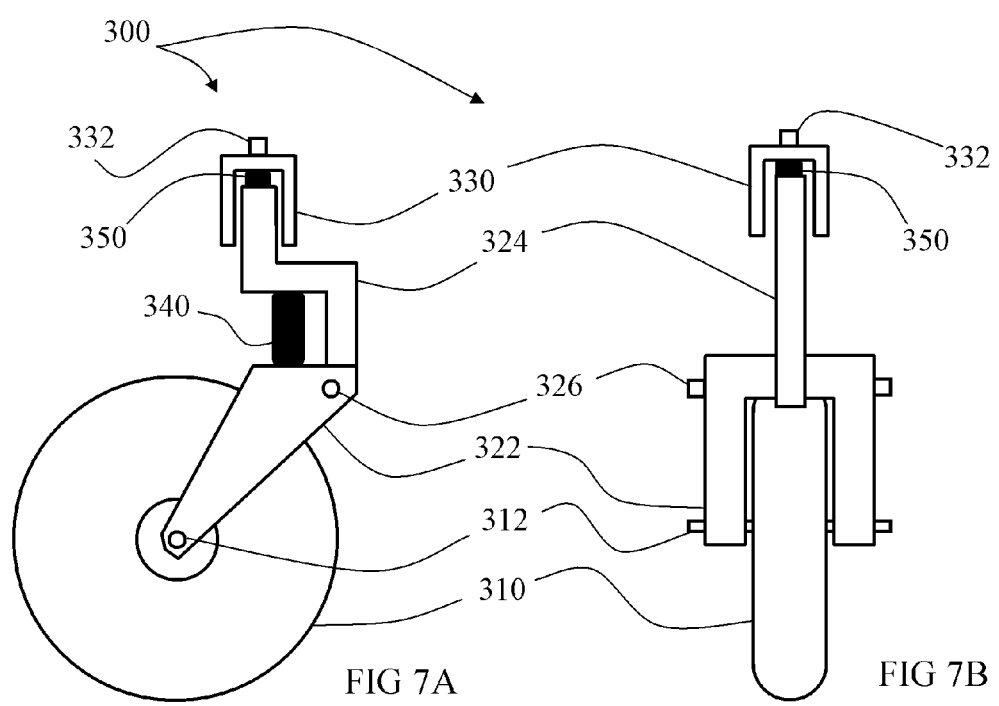
FIG 7A
FIG 7B

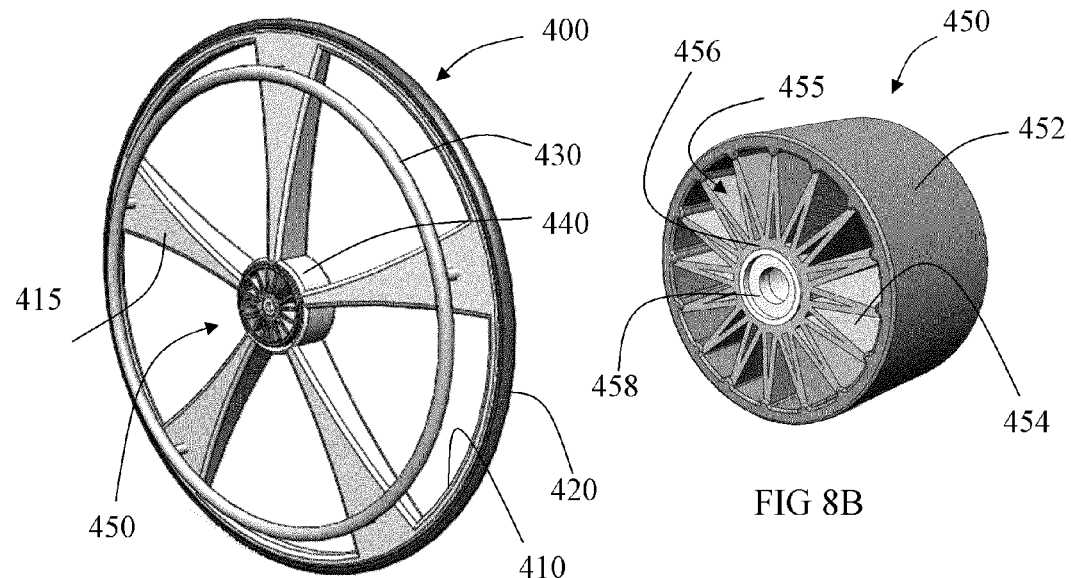
FIG 8A
FIG 8B
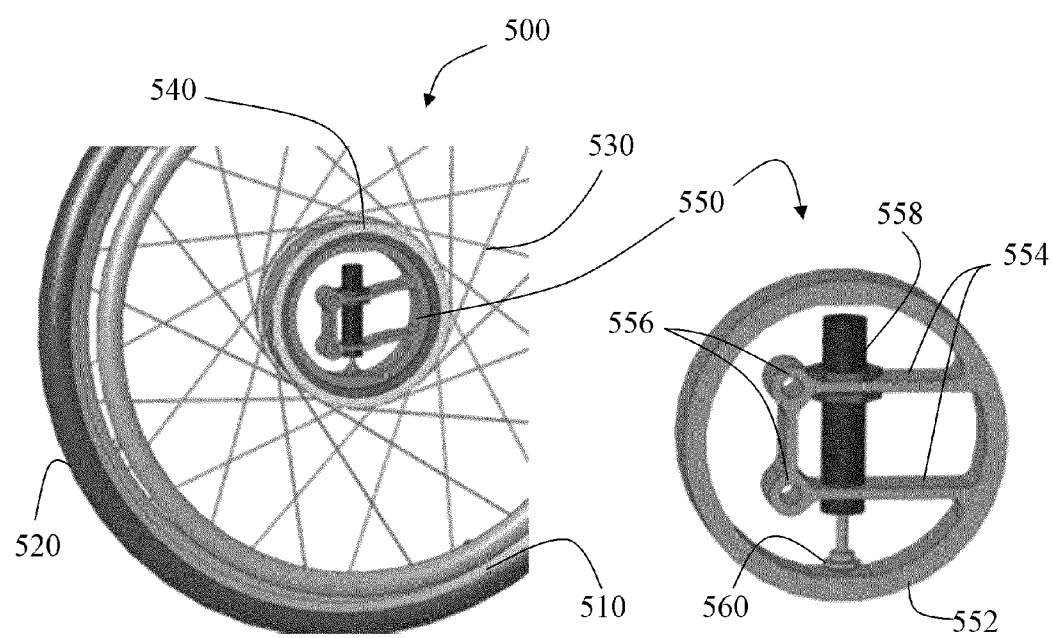
FIG 9A
FIG 9B

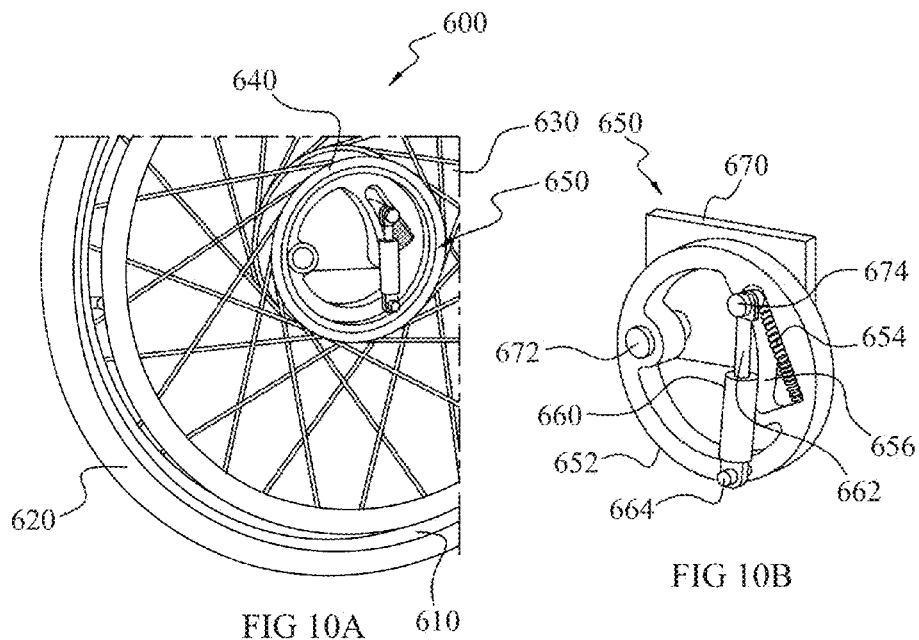
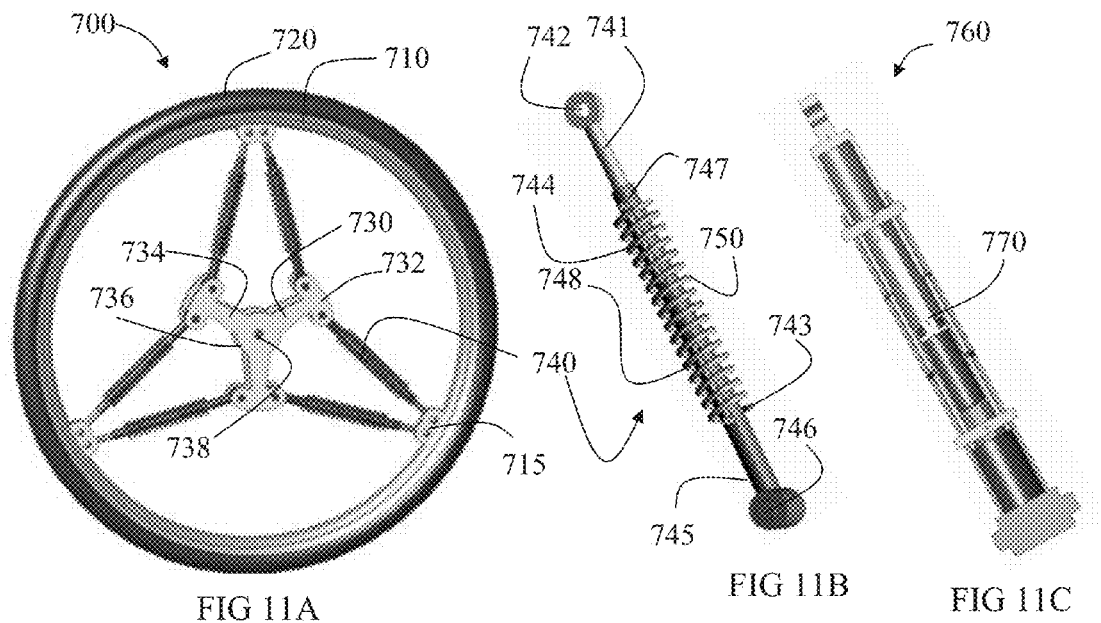

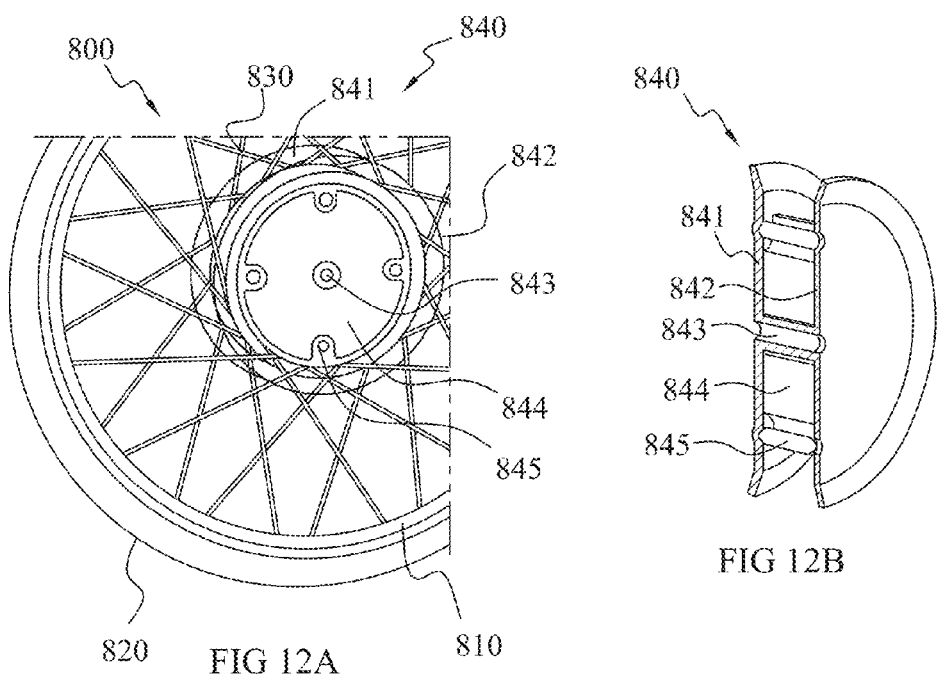
FIG 12A
FIG 12B
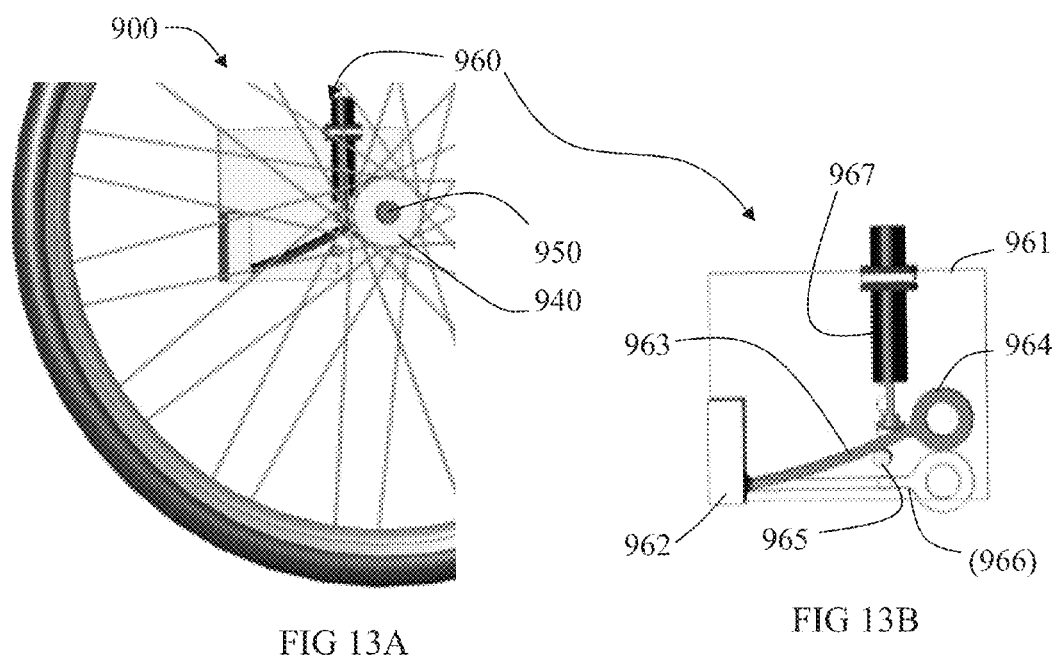
FIG 13A
FIG 13B

SELECTIVE WHEEL SUSPENSION SYSTEM

RELATED APPLICATION/S

This application is related to U.S. Provisional Patent Application No. 61/485,086 filed May 11, 2011 and to U.S. Provisional Patent Application No. 61/552,505 filed Oct. 28, 2011, both entitled "SELECTIVE WHEEL SUSPENSION SYSTEM", the disclosures of which are incorporated herein by reference in their entirety. The contents of all of the above documents are incorporated by reference as if fully set forth herein.

FIELD AND BACKGROUND OF THE INVENTION

The present invention, in some embodiments thereof, relates to suspension systems for vehicles, and in particular to suspension systems having selective activation according to parameters of the impact or perturbation.

Rotating masses tend to accommodate vibrations and shocks due to internal and/or external forces and impacts from surfaces in contact. One example is the vibratory motion of a wheel when it travels a distance on a non-purely smooth surface. Motorized and other vehicles commonly include cumbersome suspension systems in order to protect their chassis or other affiliated parts from early failure as well as to avoid unpleasant conditions to passengers.

Suspension systems, mostly including springs and damping elements, are commonly connected to static parts of the machine or vehicle, on one end, and in direct contact with the axle or other elements that provide a stable axis of rotation to the rotating mass or rotator. For example, a wheel that travels over a rough surface will transfer axial, vertical and other forces (e.g., impacts and/or vibratory) to the axle, which will be partially absorbed and diminished using suspension means that can be located between the axel and the chassis. Several attempts are known for implementing suspension mechanisms inside the wheels.

In recent years there is a growing trend towards more efficient self-propelled vehicles where the invested human power is transferred to movement of the vehicle with minimal energy loss. Modern wheelchairs and bicycles incorporate lightweight structural parts, wheels structures with improved strength-weight ratio, tires designed for minimized resistance to rolling, etc. There is also a preference of most riders to feel a rigid or responsive ride, rather than a soft one, especially when driving over substantially smooth surfaces and/or when riding upward inclines, and also when accelerating, decelerating or maneuvering. When suspension is implemented the manufacturers usually make some accepted tradeoffs between the physiological and improved comfort needs with the dynamic preferences of the users.

SUMMARY OF THE INVENTION

According to an aspect of some embodiments of the present invention, there is provided a wheel connectable to a vehicle, the wheel includes a stationary member which includes an axis and a rotary member rotatable about the axis. In some embodiments of the invention, at least one support member is positioned between the stationary member and the rotary member thereby providing a normally fixed distance therebetween. In some embodiments of the invention, the support member is adapted to retain the distance when stressed up to a threshold value and to recoverably alter the distance when stressed over the threshold value.

In some embodiments of the invention, the vehicle is a self-propelled vehicle, for example a wheelchair or a bicycle. In some embodiments, the wheel includes a castor which is fixedly rotatable about at least two axes projecting from the vehicle. In some embodiments of the invention, the stationary member includes at least one of: an axle, a caster housing, and a bearing inner ring. In some embodiments, the rotary member includes at least one of: a tire, a wheel rim, a hub shell, a fork, and a bearing outer ring.

In some embodiments of the invention, the support member includes an elastic component adapted to change in size and/or shape only at the support member stressing over the threshold value. In a first exemplary embodiment, the elastic component includes a spring, optionally a coil spring or a gas spring, optionally the spring is provided preloaded to compress only over the threshold value. In some embodiments, the threshold allows spring compression at compressive forces which are greater than a total weight of the vehicle and passengers, divided by the number of wheels and/or number of preloaded springs. In a second exemplary embodiment, the elastic component includes a compressible block polymer. In a third exemplary embodiment, the elastic component includes a buckling member adapted to buckle only at the support member stressing over the threshold value. In some embodiments of the invention, the elastic component is held in a fixed size, shape and/or position until the support member is stressed over the threshold value. In some embodiments of the invention, the wheel includes a plurality of the support member evenly distributed around the axis.

In some embodiments of the invention, the wheel includes a selective suspension member adapted to absorb and/or dissipate kinetic energy only while and/or after the support member recoverably alters the distance. In some embodiments of the invention, the wheel includes a non-threshold suspension member adapted to absorb and/or dissipate kinetic energy at the fixed distance.

In some embodiments of the invention, the threshold value relates to a minimal shock magnitude absorbed by the wheel. Alternatively or additionally, the threshold value relates to a minimal vibration amplitude absorbed by the wheel. Alternatively or additionally, the threshold value reciprocally relates to a maximal vibration amplitude absorbed by the wheel. Alternatively or additionally, the threshold value reciprocally relates to a maximal vibration frequency absorbed by the wheel.

In some embodiments of the invention, the support member is controllable using a controller linked thereto. Optionally, the controller is set to determine and/or monitor at least one of the normally fixed distance, the threshold value, and a maximally allowed alteration of the distance by the support member. In some embodiments of the invention, the controller includes at least one of a fuse, a burst valve, a movable barrier, and a buckling member. In some embodiments, the controller is programmable.

In some embodiments of the invention, the wheel includes a sensor in direct communication with the controller adapted to sense a change in a measured variable. In some embodiments, the measurable variable is indicative of the support member stressing. Alternatively or additionally, the measurable variable is indicative of an upcoming stressing.

In some embodiments of the invention, at least one of: a selective suspension member, a non-threshold suspension member, and at least one support member, is rotatable with the wheel.

According to an aspect of some embodiments of the present invention there is provided a suspension system of a self-propelled vehicle, including suspension means and a controller for controlling the suspension means.

In some embodiments, the suspension means are configured for absorbing and/or dissipating energy originating from an impact between a wheel, optionally a rear wheel of a wheelchair, and a surface. In some embodiments, the suspension means include at least one of a spring, a damper, an elastic implement, an elastomeric implement, a buckling element, and a plastically deformable implement.

In some embodiments, the controller is configured to allow or withhold operation or activity of the suspension means according to the impact parameters. In some embodiments, the controller is configured for selectively operating the suspension means when the impact includes a magnitude equal or greater than a chosen value. Alternatively or additionally, the controller is set and/or configured to withhold operation of the suspension means if the impact is lower in magnitude than the chosen value (for example: Low pass, High pass, or Band pass). In some embodiments, the controller includes at least one of a thresholding mechanism, a fuse, a burst valve, a movable barrier, and a buckling implement.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 2A-B schematically illustrate a wheel portion comprising an exemplary selectively formable support member before and after formation, in accordance with embodiments of the present invention;

FIGS. 3A-C illustrate schematic diagrams of exemplary selective suspension units, in accordance with embodiments of the present invention;

FIGS. 6A-B schematically illustrate a wheel comprising an exemplary selectively deflatable bladder, in accordance with embodiments of the present invention;

FIGS. 7A-B schematically illustrate side and back views of an exemplary caster-type wheel unit comprising selective suspension members for discrete degrees-of-freedom motions, in accordance with embodiments of the present invention;

FIGS. 8A-B illustrate an exemplary wheel comprising selectively formable hub unit, in accordance with embodiments of the present invention;

FIGS. 9A-B illustrate an exemplary wheel comprising a in-hub leaf-spring type selective suspension unit, in accordance with embodiments of the present invention;

FIGS. 10A-B illustrate an exemplary wheel comprising an in-hub spring-loaded cam-type selective suspension unit, in accordance with embodiments of the present invention;

FIGS. 11A-C illustrate an exemplary wheel comprising a plurality of spokes type selective suspension members, in accordance with embodiments of the present invention;

FIGS. 12A-B illustrate an exemplary wheel comprising selectively slidable hub unit, in accordance with embodiments of the present invention; and FIGS. 13A-B illustrate an exemplary wheel and a leaf-spring type selective suspension designed as a chassis-to-wheel adaptor, in accordance with embodiments of the present invention.

DESCRIPTION OF EMBODIMENTS OF THE INVENTION

The following preferred embodiments may be described in the context of exemplary suspension mechanisms for wheelchairs, or other types of self-propelled vehicles, for ease of description and understanding. However, the invention is not limited to the specifically described devices, and may be adapted to various applications without departing from the overall scope of the invention. For example, devices including concepts described herein may be used for suspension of any rotatable mass including wheels of motorized or otherwise powered vehicles.

Common suspension systems are built to absorb interruptions and obstacles which cause deceleration and/or undesired vibration to the vehicle and/or aid the wheel in following the terrain and avoiding loss of contact with it, or grip. In doing so, the suspension systems are built to absorb and/or dissipate energy, including such that can be translated to effective kinetic energy. Furthermore, the common suspension systems (which include, for example, parts like metal springs, cushioning materials and elastomers) cause a feeling of plushness, or softness, which may cause a sense of instability, which are undesirable by many users.

In order to answer these and other considerations, the present invention provides or includes means for selective responsiveness (or irresponsiveness) according to types and/or magnitudes of absorbed interferences or perturbations.

Figure 1A:
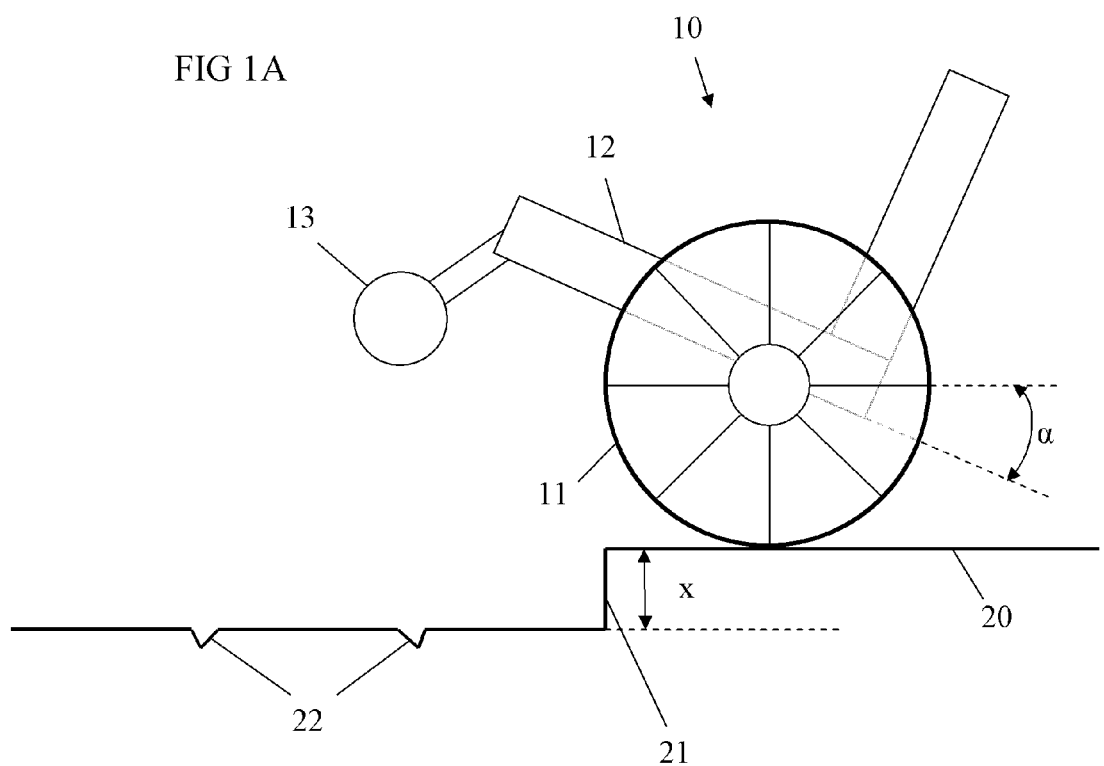
FIGS. 1A-B schematically illustrate side views of a wheelchair and a wheel anticipating different obstacles during motion, in accordance with embodiments of the present invention.
Figure 1B:
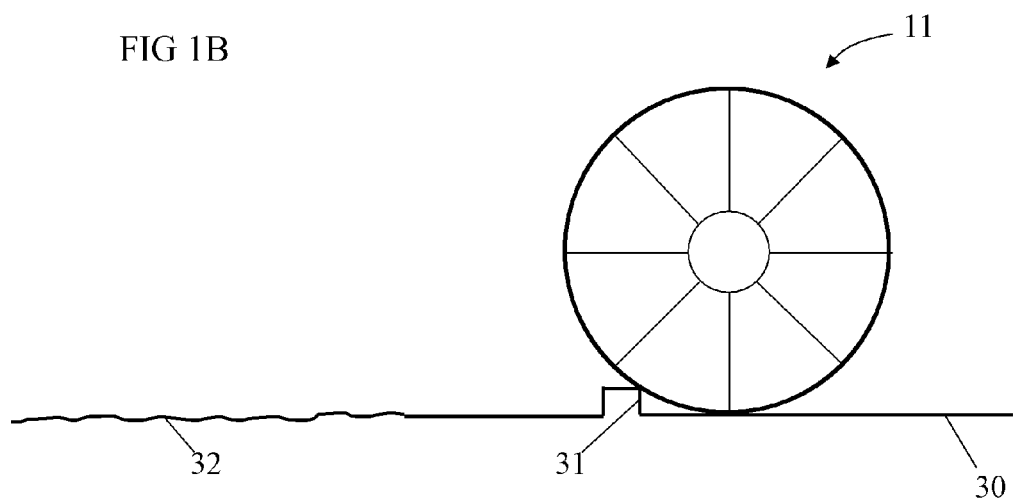

Referring now to the drawings, FIGS. 1A-B schematically illustrate side views of a wheelchair 10 and a rear wheel 11 anticipating different obstacles during motion, in accordance with embodiments of the present invention. Besides combining two rear wheels such as wheel 11, wheelchair 10 further includes a seat 12 and a pair of casters 13. In FIG.

1A, wheelchair 10 moves along path 20 which includes a step or a curb descent 21 with height x, as well as a plurality of recesses 22, such as tile gaps or chamfers on paved surfaces. Height x may be about 10 cm or more in case of a sidewalk curb, or 15 cm or more in case of a standard stairway step. Recesses 22, on the other hand, are of heights of less than 3 cm, usually around 1 cm. In some embodiments, the suspension system of the present invention includes means for selective differentiation between drops from different heights, for example drops from up to 1 cm, optionally up to 3 cm and those which are equal or higher than 1 cm, optionally 3 cm, optionally 5 cm, or higher, or lower or intermediate. Also, a selective differentiation may be applicable for a range of drops or perturbations, such as over 3 cm and under 10 cm, for example.

Wheelchair 10 is shown in motion adjacent a forward-facing step 21 with its front end is tilted upwardly (commonly known as performing a "wheelie"), pivoting around rear wheel(s) 11—a common practice when riding over steps, performed either by an attendant or by the wheelchair user himself. The tilting angle α may be between 0 to 40°, and optionally higher. Such tilting maneuver changes the impact angle of the wheelchair with the ground and should be considered when designing an effective suspension mechanism. In some embodiments, the suspension system of the present invention is configured for effective suspension of falls at different impact angles, optionally in angles range of at least −10° to 10°, optionally −30° to 30°, optionally −60° to 60°. Also, in some cases the drop can be taken in reverse, meaning that the rear wheels go first, while the front casters are still on the top platform, generating a mild "nose up" angle of generally less than 20°, but optionally higher.

FIG. 1B shows a second demonstrative scenario in which wheel 11 (shown independently for ease of demonstration only) travels along path 30 that includes a bump 31 of a significant height followed by a substantially shallow coarse road 32. In some embodiments, the suspension system of the present invention includes means for selectively differentiating between bumps of different heights, and for example may allow suspension of bumps of 0.5 cm or higher, optionally 1 cm or higher, optionally 3 cm or higher. Alternatively or additionally, such or other means may allow suspension of bumps shorter in height than wheel radius, optionally shorter than ¾ its radius, optionally shorter than ½ its radius. Alternatively or additionally, such or other means may differentiate between road types (such as between coarse roads like road 32) which cause vehicle's and/or wheel's vibrations differentiated by acceleration impact amplitude and/or frequency, optionally depending also on vehicle's velocity.

In an aspect of some embodiments, there is provided a wheel connectable to a vehicle, the wheel includes a stationary member having an axis, optionally a long axis and/or a symmetry axis, and a rotary member rotatable about the stationary member axis. The vehicle may be a powered vehicle, including but not limited to a motorized vehicle or a powered-assisted vehicle (such as intended for assisting pedal propelled bicycles or for assisting hand propelled wheelchairs), or a self-propelled vehicle such as unpowered bicycles and wheelchairs. The wheel may be a separate wheel intended for releasable connection to a vehicle body or a wheel unit such as a castor type wheel which is provided with wheel-to-vehicle connection means having at least two pivoting axes, thereby allowing fixed rotations about at least two axes projecting from the vehicle. In some embodiments, the stationary wheel member includes at least one of: an axle (including but not limited to a quick release axle), a castor housing, and a bearing inner ring, whereas the rotary wheel member includes at least one of: a tire (pneumatic or solid), a wheel rim, a hub shell, a fork, and a bearing outer ring.

According to some embodiments of the present invention, there is provided at least one support member positioned between the stationary member and the rotary member thereby providing a normally fixed distance therebetween. In some embodiments, the normally fixed distance corresponds or correlates with concentricity between the stationary and rotary members and optionally even whole wheel symmetry, whereas a change of that distance will break such geometrical balances. Optionally, alternatively or additionally, the normally fixed distance corresponds or correlates with symmetry or axisymmetry of the stationary member and/or the rotary member, whereas a change of that distance will recoverably deform stationary member and/or rotary member to a non-symmetric or a non-axisymmetric shape. A support member may be a spoke member or any other wheel body part or member extending between the rim and the hub radial. Optionally, alternatively or additionally, a support member may be located inside a wheel hub, for example between the bearing and the axle, or between the bearing and the hub shell. Optionally, alternatively or additionally, the support member is positioned inside a wheel bearing (e.g., bushing) between the inner ring and the outer ring. Optionally, the wheel includes a plurality of support members evenly distributed around the stationary member axis.

In some embodiments, the support member is selectively formable and/or operable in the sense that it is adapted to retain the normally fixed distance when stressed up to a threshold value and to recoverably alter this distance when stressed over the threshold value. In one exemplary embodiment, the support member includes an elastic component, such as but not limited to a spring, a block polymer (e.g., elastomer), and/or a buckling member, adapted to change in size and/or shape only when stressed over the threshold value. Optionally, the elastic component is held in a fixed size, shape and/or position until the support member is stressed over the threshold value. In case of a support member comprising a buckling member, the latter is adapted to buckle only when the support member is stressed over the threshold value. In case of a support member comprising a spring, for example a coil spring, a leaf spring or a gas spring, it may be preloaded so it thereby able to further compress only after the threshold value has been surpassed. Unless otherwise defined in specific embodiments of the invention, a "preload" or "preloading" shall mean a fixed compression force applied to a spring which generate or increase internal stresses tending to force the spring to recover to its relaxed form. A preloaded spring shall be fixed at a nominal compression form so that compressive forces acting thereupon shall be able to further compress it only at magnitudes that exceed the nominally preloading force at a same axis.

Present art suspension systems may incorporate some extent of preloading in the spring element, in order to ensure that no free movement of parts occurs when the suspension is fully unloaded (as during a jump) and/or in order to have more suspension travel in certain situations. In automotive applications, for example, the self-weight of the vehicle is commonly designed to surpass the force value of the preload as soon as the vehicle is provided freely on the ground. In case of common self-propelled vehicles (such as bicycles and wheelchairs), where the user/rider own-weight is the substantial part of the overall weight compressing the spring, the force value of the preload is sometimes designed to be higher than that of the weight of the vehicle itself, but substantially lower than the aggregate weight of the rider with the vehicle, therefore, as soon as the vehicle is mounted by the rider and loaded with its weight, the suspension is put into its operational regime. In the present invention the preload force value is referred to as being substantially higher than the aggregate weight of the vehicle and the rider together; therefore, the suspension is not in its operational range while the rider is on the vehicle, and optionally also under normal or predefined conditions. Optionally, the preload is designed or set according to a predetermined threshold value.

A threshold value, according to embodiments of the present invention, may include at least one of a minimal shock magnitude absorbed by the wheel (such as a 5 cm free fall onto an infinitely stiff platform), a minimal vibration amplitude applied to the wheel (such as 5 g or 50 m/s$^2$), a threshold value reciprocally related to a maximal vibration amplitude applied to the wheel and a threshold value reciprocally related to a maximal vibration frequency absorbed by the wheel (such as 3 Hz). The threshold value may be predetermined according to parameters of the vehicle and/or user or it may be inherent by the wheel and/or support member design. The threshold value may be programmable, mechanically and/or electronically, by the user, by a professional having special threshold value setting means, or by the manufacturer during production and/or assembly. A threshold value may be, alternatively or additionally, subject to continuous changes or adjustment by continuously correlating sensed or otherwise measured parameters with a pre-set memory. For example, a change of overall weight may be measured and be translated to adjustment in the threshold value, so that an identical impact absorbed by the wheel will be similarly suspended using suspension means while neglecting the added weight that would have otherwise may be translated as a magnified impact.

At some instances, at a fall of a rider riding a self-propelled vehicle, the rider may begin absorbing an impact instantly after the vehicle does, as they may act at a fall as separate bodies having different weights, momenta and/or and inertia. Therefore, a wheel contacting the ground at the beginning of vehicle's impact, or a structural member thereof, may encounter a first smaller load derived from vehicle own weight/momentum followed by a second larger load derived from rider and vehicle combined weight and/or rider momentum. In some embodiments of the invention, a selectively formable support member in the wheel is configured to deform only at impacts of the combined rider and vehicle weights at falls of minimal heights. Alternatively, the selectively deformable support member may be configured to deform also at impacts under vehicle's weight only, optionally at higher falls, provided that it effectively recovers to encounter the following impact of the combined rider-vehicle weight.

In some embodiments, the wheel of the present invention includes a selective suspension member, unit and/or system adapted to absorb and/or dissipate kinetic energy only while and/or after support member recoverably altering the normally fixed distance as previously described.

According to an aspect of some embodiments of the present invention there is provided a suspension system of a vehicle, optionally a self-propelled vehicle such as a manual wheelchair, which includes suspension means and a controller for controlling the suspension means, thereby providing a differentiation and/or selectivity properties. In some embodiments, the suspension means and/or controller are positioned in the wheel, provided attached to a wheel, and/or are rotatable with the wheel. In some embodiments, the suspension means and/or controller are positioned between an axle and a hub, optionally in a hub, optionally between a hub and a wheel body, optionally in the wheel body, optionally between a wheel body and a tire.

In some embodiments, the suspension means are configured for absorbing and/or dissipating energy originating from an impact between a wheel, optionally a rear wheel of a wheelchair, and a surface. In some embodiments, the suspension means include at least one of a spring, a damper, an elastic implement, an elastomeric implement, and a plastically deformable implement.

In some embodiments, the suspension means are adapted to generate response frequencies to the impact that are essentially over 12 Hz, optionally over 15 Hz, optionally over 20 Hz. In some embodiments, the suspension means are adapted to transmit a force to a seated user of a magnitude smaller than 90%, optionally smaller than 70%, optionally smaller than 50%, of a force magnitude originated in the impact. In some embodiments, suspension means and/or controller are adapted to effectively confront impacts at a certain range of impact angles.

In some embodiments, the controller is linked to the at least one support member and/or is configured to control its operation, size and/or form. In some embodiments, the controller is set to determine and/or monitor at least one of the normally fixed distance, the threshold value, and a maximally allowed alteration of said distance by said support member. Optionally the controller is programmable, for example by the user and/or by the manufacturer. In some embodiments, the controller is configured to allow or withhold an operation or activity of the suspension means according to the impact parameters. In some embodiments, the controller is configured for selectively operating the suspension means when the impact includes a magnitude equal or greater than a chosen value and/or a threshold value. Alternatively or additionally, the controller is set and/or configured to withhold operation of the suspension means if the impact is lower in magnitude than the chosen value. In some embodiments, the controller includes at least one of a fuse, a burst valve, a movable barrier, and a buckling implement. In some embodiments, the controller is adapted to selectively operate the suspension means before and/or during the impact, thereby substantially not reducing suspension efficiency and/or performances compared with identical non-controlled suspension means.

In some embodiments, the chosen value may be unchangeable, predetermined, and/or irreversibly programmable by a manufacturer or alternatively may be adjustable, pre-settable, and/or reversibly programmable by a user. In some embodiments, the threshold value relates to any of height, distance, velocity, acceleration, impulse, impact, temperature, pressure, and momentum. In some embodiments, the chosen value is a minimal value, a maximal value or a range, having minimal and maximal limiters.

In some embodiments, the suspension system of the present invention includes additional suspension means, e.g., a "non-threshold" suspension member, unit and/or system, which is uncontrollable by the controller and/or is adapted to absorb and/or dissipate kinetic energy at the normally fixed distance between the stationary member and the rotary member of the wheel. Such additional suspension means may be configured for handling undesired motion of different types and/or magnitude. For example, the controlled suspension means may be configured for handling impacts of magnitudes greater than a chosen value, whereas the additional uncontrolled suspension means may be configured for handling vibrations, optionally in an effective manner at a specific frequency range, optionally 0.5-80 Hz, optionally 1-30 Hz, optionally 4-12 Hz. The two suspension members types may be located at same or different parts of the vehicle. For example, in a wheelchair, the controlled/threshold suspension member may be located at the rear wheels whereas the uncontrolled/non-threshold suspension member may be located at or above the front castors and/or forks. In a second example, the two suspension members types may be located at different areas of a rear wheel, for example adjacent the hub and adjacent the tire, respectively. In some embodiments, the at least one of the selective suspension member, the non-threshold suspension member, and/or the at least one support member is rotatable with the wheel.

In some embodiments, the suspension system includes a sensor in direct communication with the controller adapted to sense a change in a measured variable indicative of a parameter related to the support member stressing and/or to a parameter related to an upcoming stressing of the support member. In some embodiments, the sensor is operable as an arming and/or a safety mechanism of the controller and/or the suspension means. In some embodiments, the sensor is adapted to transmit information to the controller before the impact.

In some embodiments, the suspension system includes a user interface in direct communication with any of the controller, the suspension means, the sensor and any communication link therebetween. In some embodiments, the user interface includes bypassing means allowing shutoff of the controller, the suspension means and/or the sensor.

Referring back to the drawings, FIGS. 2A-B schematically illustrate a wheel portion 36 comprising an exemplary selectively formable support member 35 before (FIG. 2A) and after (FIG. 2B) formation, in accordance with embodiments of the present invention. Wheel portion 36 includes an inner member 34 and an outer member 33 that are preferably, though not necessarily, maintain geometric similarity (e.g., both are circular, as illustrated). In some embodiments, when the wheel revolves there is also relative rotation between inner member 34 and outer member 33. In some embodiments, inner member 34 is fixed during wheel rotation, so that outer member 33 rotates in a velocity which is equal, less or more than wheel velocity. Alternatively, inner member 34 is rotationally free whereas outer member 33 is rotationally fixed. Inner member 34 may be any of an axle connecting between the wheel and a vehicle (e.g., a wheelchair) and an inner ring of a wheel bearing or bushing which is rotationally fixated to a vehicle at connection. Outer member 33 may accordingly be any of an outer ring of a wheel bearing or bushing or any other outwardly fixed thereto, including but not limited to a hub shell, a wheel body portion, an assembly of supporting members and/or a rim connected thereto (with or without a tire attached thereto).

Support member 35 is positioned in-between inner member 34 and outer member 33 whereas its form directly influences the distance therebetween. In case that inner member 34 and outer member 33 are circular, a distance may be considered the distance between their axes. In some embodiments, support member 35 is substantially elongated along an axis and capable to compress along this axis, or otherwise bend or buckle, and thereby decreasing the distance between inner member 34 and outer member 33. Alternatively, support member 35 may be at least partially circular (not shown), covering an angular path between inner member 34 and outer member 33, and is radially compressible, discretely or continuously, along the angular path.

In some embodiments, support member maintains a substantially or fully constant form and/or size, and optionally is stiff and/or rigid, under external forces aiming for reshaping thereof, such as compressive forces or any other compressive stresses facilitators, until such stresses or forces goes beyond a predetermined threshold value and/or once it meets a preset rule allowing it to take a different form and/or to yield. As shown in FIG. 2A, support member 35 maintains a primary form and/or size while being affected by compressive force F1 acting thereon, therefore maintains concentricity and a normally fixed distance between inner member 34 and outer member 33. In some embodiments, support member 35 maintains this primary form and/or size during variable forces, including force F1, at least until reaching or exceeding a threshold compressive force $F_{Th}$. Threshold force $F_{Th}$ may derive from a certain design or any mechanical, chemical or physical property of support member 35 or any component or portion thereof, or it may be programmable (as by using processor or other controlling means) or otherwise settable by a user and/or in production. As shown in FIG. 2B, once being compressed by a force F2 that exceeds threshold force $F_{Th}$, support member then reshapes and/or changes in size (in this example: shortens in length) thereby decreasing the distance between inner member 34 and outer member 33. In some embodiments, support member 35 is configured to regain its primary shape once compressive stresses decreases totally or below threshold force $F_{Th}$. Support member 35 may be programmed to regain primary form and/or size and/or otherwise include an elastic component or a portion acting against any change in form and/or size and to regain it once stresses decreases.

In some embodiments, support member 35 includes suspension (not shown) used for absorbing and/or dissipating kinetic energy associated with shocks, vibrations and/or other interfering signals acting thereto. In some embodiments, the suspension includes selective operable means which thereby determine overall selectivity of support member 35 to a change in form and/or size according to a preset or predetermined threshold force $F_{Th}$ and in view of actual stresses acting onto, as described above.

Reference is now made to FIGS. 3A-C which illustrate schematic diagrams of exemplary selective suspension units, in accordance with embodiments of the present invention. FIG. 3A relates to a selective suspension unit 40 which comprises a spring member 41, a damper 42 and an on/off switch 43. Spring member 41 may be any spring type, including but not limited to a coil spring, a leaf spring and a gas spring, configured to absorb incoming shocks. Damper 42 may be any damping type mechanism or component, including but not limited to a pneumatic damper, hydraulic damper, elastomeric damper, friction members or others, configured to dissipate kinetic energy, at least partly, to other forms of energy, including heat. The combined utilization of spring member 41 and damper 42 aims to change and transfers incoming shocks and vibration to usually having extended cycle time and/or decreased magnitude. In some embodiments, when switch 43 is opened (as shown), suspension unit 40 is not activated and will not act upon absorbed kinetic energy. In some embodiments, switch 43 is configured to remain open during stresses and/or forces of up to a predetermined threshold value and to close once the predetermined threshold value is crossed. Switch 43 may be connected (not shown) to a controller and/or a sensor for operation thereof in view of concurrent and/or upcoming events.

FIG. 3B relates to selective suspension unit 44 which comprises a spring member 45, preloaded with a preloading PL, and a damper 46 which may be similar to as described above with respect to damper 42. In some embodiments, preloading PL determines a threshold compressive force value (a "compression threshold") until which the spring will not compress and effectively absorb incoming shocks. Spring 45 may be preloaded by using means to fixedly compressing it to a chosen degree according to need. In some embodiments, preload PL is significant with respect to condition (e.g., form and/or size) of spring 45 at relaxed state, for example, spring 45 is initially compressed by at least 20% its relaxed length, optionally to 50% its relaxed length, or more. In some embodiments, the maximal travel of preloaded spring 45 upon receiving an over-the-threshold shock is substantially lessened with respect to its max travel if not preloaded (e.g., its relaxed length), optionally up to 10% its relaxed length, optionally up to 30% its relaxed length, optionally up to 50% its relaxed length, or higher or lower or intermediate.

FIG. 3C relates to selective suspension unit 47 which comprises a spring 48 (which may be similar to spring 41), a damper 49 (which may similar to damper 42), and a self-releasing locking member, herein refer to as snap S. In some embodiments, snap S is configured to refrain spring 48 and/or damper 49 from acting until opening. In some embodiments, snap S will open only at stresses over a threshold value. In some embodiments, snap S recloses/relocks suspension unit 47 once acting stresses decreases below the threshold.

Figures 4A, 4B:
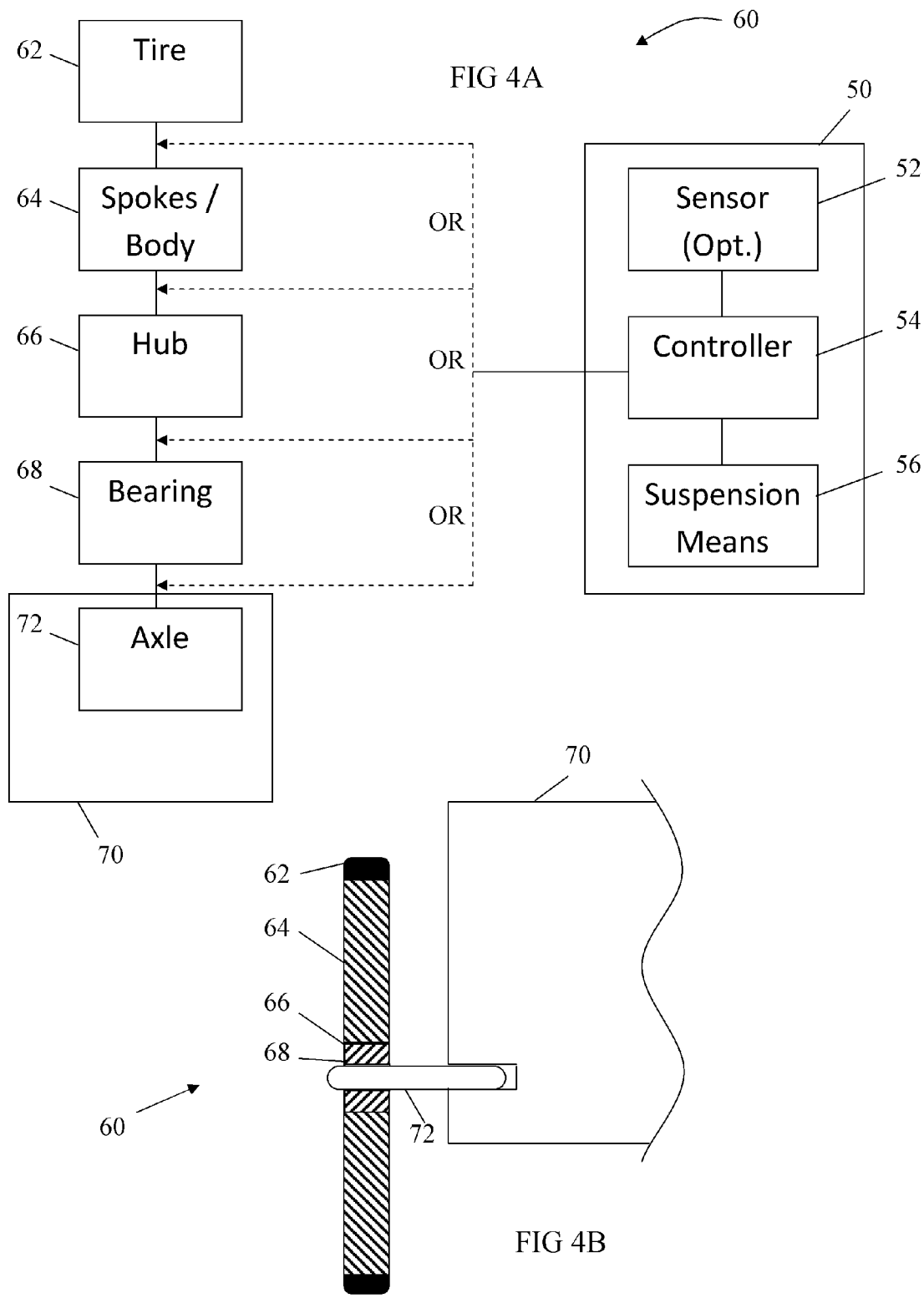
FIGS. 4A-B provide schematic illustration of a wheel connected with a chassis part and a block diagram of an exemplary suspension system and possible implementations thereof, in accordance with some embodiments of the present invention.

Reference is now made to FIGS. 4A-B which provide a schematic illustration of a rear wheel 60 of a wheelchair connected with a chassis part 70 via an axle 72, including a block diagram of an exemplary suspension system 50 and possible implementations thereof, in accordance with some embodiments of the present invention. In some embodiments, wheel 60 comprises a bearing(s) 68 rotatable around axle 72, a hub 66, wheel body 64 which may or may not include a plurality of spokes, and optionally a tire 62 (pneumatic or otherwise). In some embodiments, suspension system 50 includes suspension means 56, an optional controller 54 and an optional sensor 52, which are characterized as described above. As shown in FIG. 4A, suspension system 50 is positioned in or adjacent wheel 60, and may optionally be part of wheel 60. In different configurations suspension system 50 may be positioned between tire 62 and body 64, between body 64 and hub 66, or optionally in hub 66, as for example between bearing 68 and axle 72. Suspension system 50 may be provided as an adapter between wheel 60 and axle 72 (not shown). Sensor 52 may be distant to rest of suspension system 50 parts, in order to optionally sense relevant incoming events in advance. In an exemplary embodiment, sensor 52 is directly linked to front castors (not shown) of the wheelchair while transmitting measured signals to controller 54 which then controls action of suspension means 56 optionally provided in wheel 60. Sensor 52 may be used to measure parameters including but not limited to any of: a shock magnitude, a vibration average, minimal or maximal magnitude, a frequency, a temperature, a pressure, a visual content, a sound bit, a sitter's added weight and/or others. Controller 54 may be mechanical and/or electrical, optionally programmable. Alternatively or additionally, controller 54 is provided as auxiliary device, optionally a personal computer, a tablet computer, a Bluetooth device or controller, a PDA or a Smartphone.

Figure 5A:
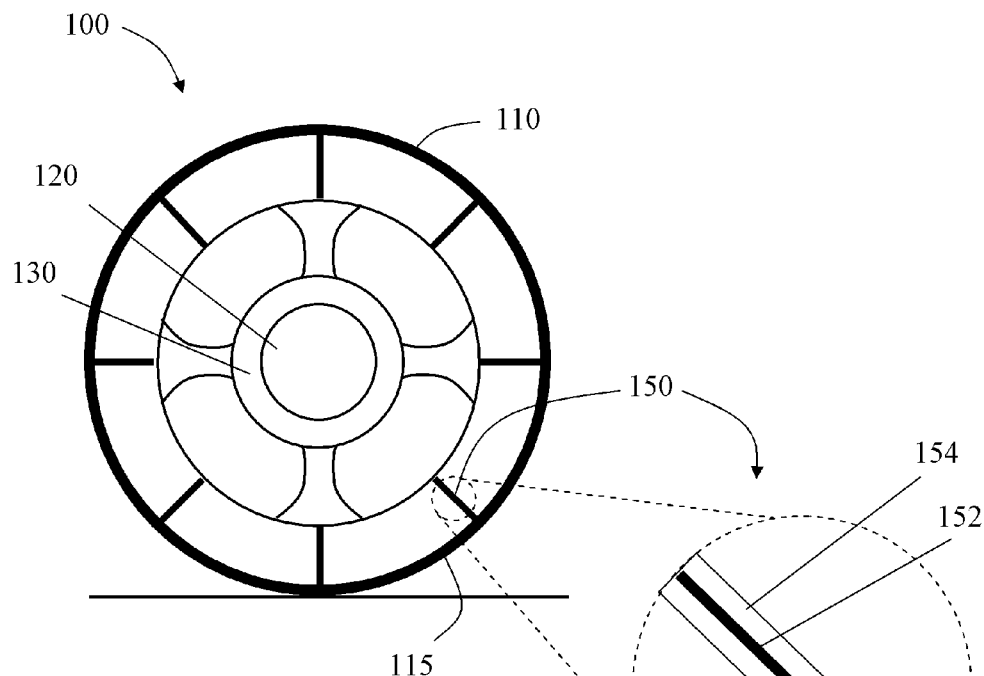
FIGS. 5A-B schematically illustrate a wheel comprising an exemplary selective wheel suspension unit, comprising an exemplary buckling member, before and after impact with an obstacle, in accordance with some embodiments of the present invention.
Figure 5B:
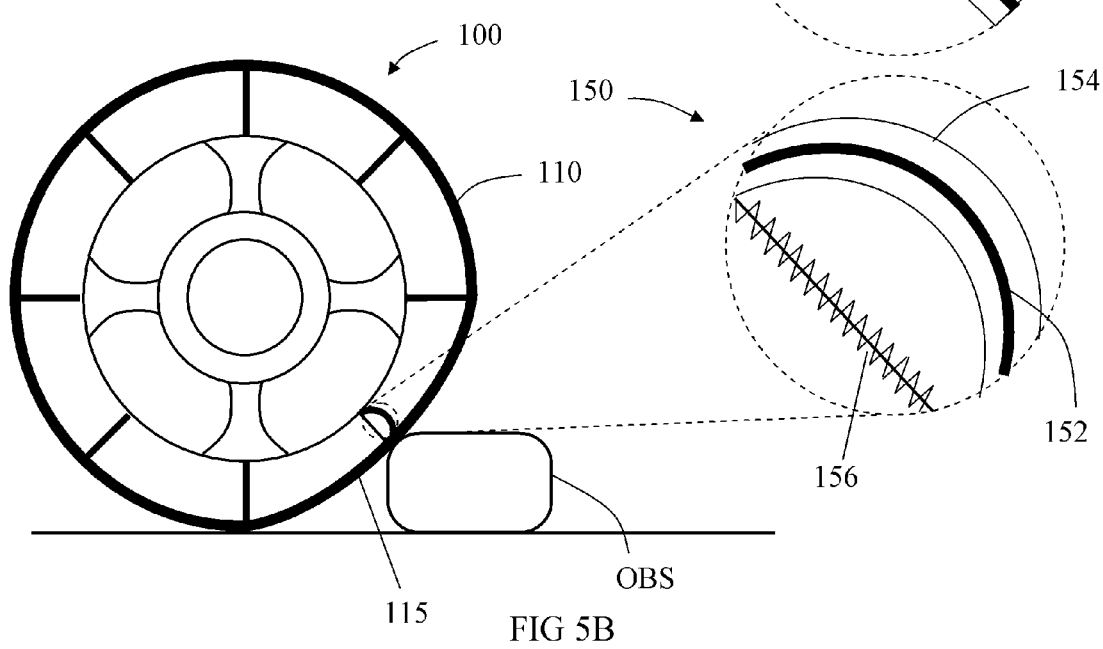

Reference is now made to FIGS. 5A-B which schematically illustrate a wheel 100 that comprises at least one exemplary selective wheel suspension unit 150 before (FIG. 5A) and after (FIG. 5B) impact with an obstacle OBS, in accordance with some embodiments of the present invention. Wheel 100 includes a tire 110, a hub 120 and a body 130 which laterally extends between the hub and the tire. Hub 120 may include a bearing or other means which facilitate free rotation possibility with an axle (not shown). Tire 110 may be pneumatic, elastic, semi-rigid or rigid. In some embodiments, selective suspension unit 150 includes a selector member 152 which in this example is an elastic elongated member that is configured to maintain a substantially straight form under axial forces that are less than a chosen threshold buckling force, and buckle to a bent form when encountering axial forces exceed the threshold buckling force. In some embodiments, the elastic elongated member regains its original straighten form when the axial forces decreases or reaches a smaller predetermined value, either the same or different than the minimal buckling force.

In some embodiments, selective suspension unit 150 includes a damping member 154 which may or may not be connected to, adjacent and/or encapsulating selector member 152, and is configured to deform when selector member 152 bends (as shown in FIG. 5B). In some embodiments, damping member 154 includes an elastomeric material, a sponge, a hydraulic or pneumatic damper and/or a metal or composite material that is plastically deformable at the suggested situation; therefore it is characterized by energy absorption and/or dissipation when deformed.

In some embodiments, selective suspension unit 150 includes a spring member 156 which may include any type of spring element, including but not limited to coil spring (as illustrated in FIG. 5B), gas spring, leaf spring or others. In some embodiments, spring member 156 is configured to exert axial force when compressed or otherwise deformed when selector member 152 buckles, thereby resists overall compressive deformation and assists in regaining the original form. Optionally, spring member 156 includes damping features, in which case there may not be a need for damping member 154. In some embodiments, damping member 154 and/or spring member 156 permits a limited allowed bending and/or compressing, which also limits the bending of the buckled selector member 152. In some embodiments, selective suspension system includes means for avoiding deflection of selector member 152 under non axial stresses (not shown).

As shown in FIG. 5B, wheel 100 is shown during impact with an obstacle OBS causing it to partially deform. A wheel segment 115, comprising of a segment of a tire 110 and a corresponding rim of wheel body 130, is centrally supported with selective suspension unit 150 and extending in between two other adjacent suspension units. In some embodiments, wheel segment 115 ultimately deforms during impact when selector member 152 buckles (as shown in FIG. 5B) but remains intact if the impact is too small to buckle selector member 152. In some embodiments, each wheel segment will react independently during impact and, for example, a deformation of wheel segment 115 will not reflect to other segments of wheel 100 and they will remain intact as if there is no impact. In some embodiments, the action-reaction characteristics of selective suspension unit 150, when deformed and regain its nominal shape, causes wheel 100 to improve its traversability over obstacles such as OBS, as wheel segment 115 in contact, substantially increases in curvature diameter and/or even bent over OBS. In some embodiments, such a design may allow travel over extremely rough and uneven terrain, or even climbing stairs up or down, depending on preset threshold magnitude. In some embodiments, additional non-threshold and/or uncontrolled suspension means are positioned in wheel 100 (not shown), for example around or in hub 120. In some embodiments, such uncontrolled suspension means are configured to absorb and/or dissipate energy at any encounter. In some embodiments, the uncontrolled suspension means are adapted to work and/or be especially effective at low-amplitude and/or low-frequencies (or, alternatively, high-frequency) encounters, such as in cases of riding over shallow coarse surfaces and patterned paved surfaces; whereas, optionally, selective suspension unit 150 is adapted to work and/or be especially effective at high-amplitude encounters, such as in cases of falls from stairs and curbs or impacts with non negligible bumps. Exemplary uncontrolled suspension means may include elastomeric or hydraulic bushing(s), and/or annular hydraulic or pneumatic rotatable dampers, such as exemplary dampers disclosed in International Patent Application number PCT/IB2012/000100 to Rogozinski et al, the disclosure of which is fully incorporated herein by reference.

Reference is now made to FIGS. 6A-B which schematically illustrate a wheel 200 which comprises an exemplary selectively deflatable bladder 250, in accordance with embodiments of the present invention. Wheel 200 is similar to wheel 100 in that it contains independent portions each having "regional" selective suspension capabilities. Wheel 200 includes a wheel body 220 wearing a tire 210. In some designs, tire 210 may be excluded. Wheel body 220 includes a plurality of compartments such as compartment 230 that houses bladder 250. Compartment 230 is at least partly elastic or plastic, at least at its outer surface in contact with tire 210. Bladder 250, serving as a sectional selective suspension unit, includes an elastic shell 252 which is normally filled with air to a predetermined degree, optionally to maximal capacity. A spring element 254 is positioned inside shell 252 thereby forcing it to an expanded size depending on total forces acting thereupon. Bladder 250 further includes at least two unidirectional air-flow valves—deflation valve 256 which allows air to only flow out of bladder 250 and inflation valve 258 which allows air only to flow in bladder 250. Preloading (not shown) provided to spring 254 and/or to deflation valve 256 will determine a threshold impact magnitude by which bladder 250 deflates and therefore reshapes and reduces in volume. Deflation valve 256 may include a minute opening to thereby resist air flow passing therethrough and by doing so act as a damping agent (e.g., the damped energy is turned into acceleration of the jet of air exiting the bladder). Inflation valve 258 may be provided with a large enough opening so that once compression stress decreases from the threshold value, optionally as the wheel rotates, reinflation will be prompt and make bladder 250 ready to possible future interactions.

Reference is now made to FIGS. 7A-B which schematically illustrate side and back views of an exemplary caster type wheel unit 300 comprising selective suspension members 340 and 350 for discrete degrees-of-freedom motions, in accordance with embodiments of the present invention. Caster wheel unit 300 includes a wheel 310 fixedly rotatable to a fork 322 with an axle 312. Fork 322 is pivotally connected to a stem 324 with a pin 326 and further supported with a fork support member 340 resisting pitching motion of stem 324 and/or fork 322 about pin 326. In some embodiments, fork support member 340 is rigid and/or maintains a fixed height up to a predetermined threshold, and thereafter recoverably decreases in size. Alternatively, fork support member 340 behaves reciprocally to magnitude in the sense that it can elastically change in height and/or shape when being stressed with magnitudes that are less than a predetermined threshold, but becomes stiff and maintains a height and/or a shape when stresses exceed threshold. In some embodiments, viscoelastic or non-Newtonian materials (e.g., Silly-Putty™ by Crayola LLC, PA, USA) may be provided in fork support member 340 thereby providing viscous flow characteristics (e.g., providing plushness) at low-magnitude shocks, and a stiff and/or elastic behavior at high-magnitude shocks. Stem 324 is pivotally connectable to a fork or stem housing 330 that is provided as a component in a wheelchair (not shown) using a bolt connection 332. Such pivoting allows swiveling or yawing motion of wheel unit 300 in fork housing 330, thereby improving wheelchair maneuverability. In some embodiments, a stem support member 350 is provided in-between stem 324 and fork housing 330 that is variably or selectively resistive to swiveling motion. In some embodiments, stem support member 350 is adapted to change in form and/or size only if stressed over a threshold value, or alternatively it is subject to change in form and/or size only while it is stressed under a threshold value. In some embodiments, at least one of fork support member 340 and stem support member 350 includes suspension capabilities so that when motion is selected to occur, the kinetic energy is at least partially absorbed and/or dissipated.

Reference is now made to FIGS. 8A-B which illustrate an exemplary wheel 400, optionally a bicycle wheel or a wheelchair rear-wheel, comprising selectively formable hub unit 450, in accordance with embodiments of the present invention. Wheel 400 includes a rim 410 wearing a tire 420, a plurality of compression spokes, such as spoke 415, supporting rim 410 and connecting it to outer boundaries of a substantially rigid hub shell 440 that houses formable hub unit 450. An optional pushrim 430 is connected laterally to rim 410 for manually propelling a wheelchair. Formable hub unit 450 includes an elastic outer sleeve 452 covering an axisymmetric truss 455 comprising a plurality of support members 454 which are outwardly radially projected from an inner sleeve 456 and connected at their radially farther end to outer sleeve 452. Inner sleeve 456 is provided over a bearing 458 that is mountable on a quick release axle (not shown) connectable to a wheelchair. In some embodiments, truss 455 is substantially stiff, at least with respect to outer sleeve 452, although support members 454 maintain shape and/or size recoverable (e.g., elastic) properties. In some embodiments, truss 455 is configured to support axisymmetric shape of outer sleeve 452 and/or concentricity thereof with bearing 458, thereby allowing constant radii when wheel 400 rotates, up to a compressive stressing which exceeds a predetermined threshold value. Optionally, alternatively or additionally, outer sleeve 452 is a springy tubular member configured to recoverably alter its tubular or axisymmetric form at some ranges of compressive forces, whereas truss 455 facilitates a minimal threshold value which below that no actual or substantial compression will take place. In the latter case, the outer sleeve 452, with or without an added effect made by truss 455, will force the entire hub unit 450 to recover back into its axisymmetric form once a compressive force is removed or falls under a value, optionally the threshold value. In some embodiments, when compression threshold is crossed, at least one of support members 454 is forced to recoverably buckle, thereby altering the distance and/or concentricity between hub sell 440 and bearing 458. In some embodiments, elastic characteristics of outer sleeve 452 assists or facilitate recoverability of truss 455 or any of support members 454 once compressive stresses decreases to under the compressive threshold. In some embodiments, formable hub unit 450 acts as a selective suspension unit once allowed to shape under compressive stresses. In some embodiments, outer sleeve 452 and/or truss 455 includes elastomeric members or portions which act as damping means, whereas the combination of support members 454 and outer sleeve 452 acts as axisymmetric radial spring.

Reference is now made to FIGS. 9A-B which illustrate an exemplary wheel 500, optionally a bicycle wheel or a wheelchair rear-wheel, comprising an in-hub leaf-spring type selective suspension unit 550, in accordance with embodiments of the present invention. Wheel 500 includes a rim 510 wearing a tire 520, a large diameter bearing 540, and a plurality of tension spokes 530 connecting therebetween and supporting rim 510 to maintain a circular form under variable compressive stresses. Selective suspension unit 550 is connected to the inner surface of bearing 540 inner ring, and includes a rigid circular frame 552 and a two-members leaf spring 554 connected at two points to its inner surface. Leaf spring 554 includes two ports 556 for rotatably fixating it to a wheelchair using pins provided therethrough. A hydraulic damper 558 is provided across leaf spring 554 and fixated with its piston member 560 to frame 552. In some embodiments, at least one of leaf spring 554 and damper 558 are provided preloaded to thereby act as a selective suspension unit as previously described. Only above a predetermined threshold value, a shock absorbed by wheel 500 will cause leaf spring 554 to bend, thereby recoverably altering the normally fixed distance between fixation ports 556 and frame 552.

Reference is now made to FIGS. 10A-B which illustrate an exemplary wheel 600 comprising an in-hub spring-loaded cam-type selective suspension unit 650, in accordance with embodiments of the present invention. Similarly to wheel 500, wheel 600 includes a rim 610 wearing a tire 620, a large diameter bearing 640, and a plurality of tension spokes 630 connecting therebetween and supporting rim 610 to maintain a circular form under variable compressive stresses. Selective suspension unit 650 is connected to the inner surface of bearing 640 inner ring, and includes a rigid circular frame 652 that is fixedly rotatable to a wheelchair chassis portion 670 with a pin 672. A cam-like rounded slot 656 is provided in frame 652 and allows a traveling pin 674 projecting from chassis portion 670 to travel along its rounded inner periphery while being supported with a spring 656 continuously pressing it against the rounded periphery. A damper 660 is also provided and connected at a first end 662 to traveling pin 674 and at a second end 664 to frame 652. In some embodiments, at least one of spring 654 and damper 660 are provided preloaded thereby facilitating selective suspension capabilities. Only above a predetermined, possibly adjustable, threshold value, a shock absorbed by wheel 600 will cause frame 652 to rotate around pin 672 while inner periphery of slot 656 moves relatively to traveling pin 674, whereas the shock is absorbed with spring 656 and damper 660.

Reference is now made to FIGS. 11A-C which illustrate an exemplary wheel 700 comprising a plurality of spokes type selective suspension members 740 (or 760), in accordance with embodiments of the present invention. Wheel 700 includes a rim 710 wearing a tire 720, a hub 730 and the plurality of members 740 that are provided symmetrically and evenly distributed and connecting between rim 710 and hub 730. In some embodiments, members 740 support a fixed distance, under a compressive forces of less than a threshold magnitude, between hub 730 and contact regions (e.g., flanges 715) at rim 710. Optionally, members 740 do not maintain or only partially support circularity of rim 710, and therefore the latter is optionally provided strengthen with respect to previously shown rims. In some embodiments, hub 730 includes a center rounded portion 736 having a bore 738 passing therethrough and housing a bearing (not shown) mountable to a chassis (e.g., of a wheelchair) using an axle. Three outwardly radial extensions 734 originate from hub center 736; each radial extension 734 ends with an angularly extended head 732; each angularly extended head 732 includes two lateral sides; wherein each lateral side is hingedly connected to an inward connection portion 742 of a member 740. Member 740 includes an outward connection portion 746 which is hingedly connected to rim 710 at flange 715. Each member 740 includes a piston 741 slidably movable in a cylindrical housing 745. Both piston 741 and housing 745 includes linear slots (744 and 748, respectively) provided along and in parallel to their longitudinal axes, and each include a movable pin (743 and 747, respectively) that is slidably movable in a corresponding slot (pin 743 in slot 748 and pin 747 in slot 744). A preloaded compression spring 750 is provided connected in-between pin 743 and 747. Spring 750, when fully relaxed or compressed under a predetermined threshold value (according to preloading), maintains pins 743 and 747 at a normally fixed distance. When piston 741 and housing 745 are subject to compression or extension stresses that are over the predetermined threshold value, the pins ultimately move one towards the other thereby compressing spring 750. A damping member (not shown) may also be provided and configured to act in parallel to contraction motions of spring 750. Member 760 is an alternative design that can replace member 740, and while preserving similar qualities, it is based on gas spring 770 instead of coil spring 750. Similarly, when member 760 elongates or shortens at stresses exceeding the threshold value, gas spring 770 will be forced to compress. In some embodiments, gas spring 770 includes damping capabilities, as known in the art.

Reference is now made to FIGS. 12A-B which illustrate an exemplary wheel 800 comprising selectively slidable hub unit 840, in accordance with embodiments of the present invention. Wheel 800 includes a rim 810 wearing a tire 820, the slidable hub unit 840 and a plurality of tension spokes 830 connecting between rim 810 and slidable hub unit 840. Slidable hub unit 840 includes a rigid anterior plate 841 fixedly connected to a rigid posterior plate 842 with a rigid channel 843 encapsulating a bearing (not shown) mountable to a chassis (e.g., of a wheelchair) using an axle (not shown). An annular elastomer 844 is provided around channel 843 and in-between plates 841 and 842. Four double-sided fasteners 845 are evenly distributed around outer periphery of elastomer 844, each fastener 845 is compressedly maintained by its two sides in opposite corresponding recesses (not shown) on inner surfaces of plates 841 and 842. In some embodiments, fasteners 845 includes a ball-and-spring plunger mechanism, with a ball popping out at each end and being compressed against a corresponding recess by the spring. In some embodiments, all springs are preloaded so that the fasteners may migrate out of the recesses only over a predetermined threshold value related to an impact magnitude acting thereto in a certain direction. A ring (not shown) is provided over the four fasteners 845 and elastomer 844, to which the spokes 830 inwardly projecting ends are connected. Therefore, an impact absorbed by the tire 820 and rim 810 is projected via spokes 830 and their connecting ring to fasteners 845. Under stresses that are less than the threshold value the fasteners 845 will remain in-place hence wheel 800 will remain rigid, whereas under stresses higher than the threshold value, fasteners 845 will be forced to pop out of their corresponding recesses. A relative motion is therefore made between the wheel body (comprising of tire 820, rim 810, spokes 830 and fasteners 845) with respect to hub unit 840, and elastomer 844 provided in-between is forced to deform while resisting the motion and acting both as a spring and as a damper. Once stresses decrease, hub unit 840 regains its normal shape and fasteners 845 slip back into place.

Reference is now made to FIGS. 13A-B which illustrate an exemplary wheel 900 connected to a leaf-spring type selective suspension 960 designed as a chassis-to-wheel adaptor, in accordance with embodiments of the present invention. Wheel 900 is optionally a commercially available rear wheel releasably connectable to a wheelchair via a hub 940. Suspension 960 is connectable to a wheelchair via plate 961 and comprising a leaf spring 963 fixated to plate 961 with a support 962 and having a free end 964 having a lumen and connectable to hub 940 using an axle 950. Leaf spring 963 is preloaded by repositioning it from a primary position (966) and fixating it to its preloaded position using a pin 965. A damper 967 is configured to act if spring 964 is forced to further bend when stresses are over a threshold value determined by its preloading.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

The invention claimed is:

1. A wheel connectable to a vehicle comprising:
    a stationary member comprising an axis;
    a rotary member rotatable about said axis;
    at least one support member positioned between said stationary member and said rotary member thereby providing a normally fixed distance therebetween;
    wherein said support member is adapted to retain said distance when stressed up to a threshold value and to recoverably alter said distance when stressed over said threshold value; and
    wherein said support member comprises:
    a housing including a housing slot along and in parallel to the housing longitudinal axis, and further including a housing pin that is slidably movable in said housing slot;
    a piston slidably movable in said housing and including a piston slot along and in parallel to the piston longitudinal axis, and further including a piston pin that is slidably movable in said piston slot; and
    a compression spring connected in-between said housing pin and said piston pin;
    wherein, said spring, when fully relaxed or compressed under a predetermined threshold value, maintains said housing pin and said piston pin at a normally fixed distance.

2. The wheel according to claim 1, wherein said vehicle is a self-propelled vehicle.

3. The wheel according to claim 1, wherein said vehicle is a wheelchair.

4. The wheel according to claim 1, wherein said stationary member comprising at least one of: an axle, a caster housing, and a bearing inner ring.

5. The wheel according to claim 1, wherein said rotary member comprising at least one of: a tire, a wheel rim, a hub shell, a fork, and a bearing outer ring.

6. The wheel according to claim 1, wherein said support member comprising an elastic component adapted to change in size and/or shape only at said support member stressing over said threshold value.

7. The wheel according to claim 6, wherein said elastic component comprising a spring.

8. The wheel according to claim 7, wherein said spring is provided preloaded to compress only over said threshold value.

9. The wheel according to claim 6, wherein said elastic component is held in a fixed size, shape and/or position until said support member is stressed over said threshold value.

10. The wheel according to claim 1, comprising a selective suspension member adapted to absorb and/or dissipate kinetic energy only while and/or after said support member recoverably alters said distance.

11. The wheel according to claim 1, wherein said threshold value relates to a minimal shock magnitude absorbed by said wheel.

12. The wheel according to claim 1, wherein said threshold value relates to a minimal vibration amplitude absorbed by said wheel.

13. The wheel according to claim 1, wherein said threshold value reciprocally relates to a maximal vibration amplitude absorbed by said wheel.

14. The wheel according to claim 1, wherein said threshold value reciprocally relates to a maximal vibration frequency absorbed by said wheel.

15. The wheel according to claim 1, comprising a plurality of said support member evenly distributed around said axis.

16. The wheel according to claim 1, wherein, when said piston and said housing are subject to compression or extension stresses over said predetermined threshold value, said housing pin and said piston pin move towards each other so as to compress said spring.

17. The wheel according to claim 1, wherein said spring is a coil spring or a gas spring.

* * * * *